United States Patent [19]

Peccoux et al.

[11] Patent Number: 5,679,734

[45] Date of Patent: Oct. 21, 1997

[54] SILICONE COMPOSITION WHICH CAN BE CROSSLINKED INTO AN ADHESIVE GEL

[75] Inventors: Pierre-Michel Peccoux, Lyon; Christian Pusineri, Serezin du Rhone, both of France

[73] Assignee: Rhone-Poulenc Chimie, Courbevoie, France

[21] Appl. No.: 631,281

[22] Filed: Apr. 12, 1996

[30] Foreign Application Priority Data

Apr. 14, 1995 [FR] France ................... 95 04760

[51] Int. Cl.$^6$ ................... C08K 5/54
[52] U.S. Cl. ................... 524/267; 525/478; 524/268; 524/731; 528/15
[58] Field of Search ................... 528/15; 524/267, 524/268, 731; 525/478

[56] References Cited

U.S. PATENT DOCUMENTS

| | | | |
|---|---|---|---|
| 4,057,596 | 11/1977 | Takamizawa et al. | 528/15 |
| 4,382,057 | 5/1983 | Tolentino | 528/15 |
| 4,709,001 | 11/1987 | Maxson | 528/15 |
| 5,239,035 | 8/1993 | Maxson | 528/115 |
| 5,371,163 | 12/1994 | Wilson | 528/15 |

FOREIGN PATENT DOCUMENTS 0 069 451  1/1983  European Pat. Off. ......... C08L 83/04

0 240 162  10/1987  European Pat. Off. ......... C08L 83/07

*Primary Examiner*—Melvyn I. Marquis
*Attorney, Agent, or Firm*—Andrew M. Solomon

[57] ABSTRACT

The present invention relates more specifically to silicone compositions which can be crosslinked into an adhesive gel by hydrosilylation at room temperature, as well as to the gels thus obtained. One of the objects of the invention is to produce, easily and rapidly, gels having viscoelastic qualities, low-temperature physical stability and adhesion properties.

This objective is achieved by virtue of the compositions comprising:

a polyorganosiloxane POS (I) of the SiVi type (Vi=vinyl);

a POS (II) of the SiH type;

an extender POS (III) of the α,ω-hydrogen, SiH type; and, optionally, a diluent POS (IV) of the polydimethylsiloxane type; where $$r_1 = \frac{\text{SiH of (III)}}{\text{SiH of (III) and (II)}} \times 100 < 80\%$$

and $$r_2 = \frac{\text{SiH (II)} + \text{(III)}}{\text{SiVi (I)}} \leq 0.8$$

Application: protection of electronic equipment (potting), adhesives, prostheses.

25 Claims, No Drawings

SILICONE COMPOSITION WHICH CAN BE CROSSLINKED INTO AN ADHESIVE GEL

The field of the present invention is that of compositions based on polyorganosiloxanes (POS) capable of crosslinking by addition or hydrosilylation reactions, involving hydrogen substituents and ethylenically unsaturated radicals, that is to say alkenyls, in particular of the vinyl type. Hydrosilylation is generally catalyzed by metal compounds, for example platinum-type compounds.

The present invention relates more precisely to silicone compositions which can be crosslinked into an adhesive gel by hydrosilylation at room temperature.

The subject of the present invention is also the gels resulting from the crosslinking of the abovementioned compositions.

In the sense of the present invention, the term silicone gel denotes a crosslinked silicone product characterized by a degree of penetration of, for example, between 100 and 500 tenths of a millimeter (measured by ASTM D 217 penetrometry).

Finally, the invention relates to the storable precursor systems for such silicone gels.

These semi-solid semi-liquid gels are conventionally used for protecting electronic equipment sensitive to vibrations, to mechanical shocks and to temperature and, more generally, to physical and chemical attack by the ambient atmosphere. In order to be used in this application, silicone gels encapsulate electronic components (potting) and their damping and dielectric properties, their insulating character and their ability to remove heat are in particular exploited. It is also highly desirable for these gels to have a certain bondability with respect to substrates comprising the sensitive elements to be protected and/or with respect to the elements themselves. This is because adhesion guarantees the effectiveness of the potting since it complements the insulation with respect to the attacking external medium. Another specification expected of silicone gels is a high rate of crosslinking, having a regard for industrial feasibility and profitability requirements as well as to ease of use. Finally, given the extreme conditions, especially temperature conditions, to which silicone gels may be exposed in this application, these gels must maintain their physico-chemical properties, in particular their gel texture with all the viscoelastic properties pertaining thereto, at very low temperatures (−60° C.).

Besides this application of encapsulation and protection of sensitive electronic elements, silicone gels can also be used:

- as an adhesive, as long as their adhesive properties are significant;
- as a shock-absorber material;
- as a basic medical material, especially for making prostheses and implants;
- or even as an assembly cement or as a sealing mastic, among other uses.

As disclosed in U.S. Pat. No. 4,072,635, silicone gels are conventionally formed as the product of a hydrosilylation reaction occurring in a mixture essentially comprising:

a polyorganosiloxane having a viscosity of from 10 to 10,000 centistokes at 25° C. and formed by a copolymer containing terminal siloxyl units or groups $M=R_2ViSiO_{1/2}$, units $D=R_2SiO_{2/2+ec}$ and $RViSiO_{2/2}$ as well as siloxyl units T (silicone resin topics)=$RSiO_{+e,fra\ 3/2}$, where R corresponds to a methyl (Me) or a phenyl (Phe) group and Vi represents a vinyl radical;

a polyhydrogenoorganosiloxane liquid of formula $XRMeSiO(R_2SiO)_x$—$(RHSiO)_m SiMe\ RX$, where R is as defined above and X corresponds to H or R;

and a platinum-based catalyst.

This US patent relates the attainment of a correct rate of crosslinking, in the presence of vinyl functionalities (hydrosilylation reactive Functional groups) at the ends of the non-hydrogen-containing POS.

The gels obtained from these POS with vinyl groups at the end of a chain and within the chain, and from POS which contain hydrogen, also at the end of a chain and within the chain, have crosslinking rates which are respectable but which fail to conceal the inadequacies of the said gels with respect to elastic properties, to the stability of these elastic properties over time and at low temperature and to the low self-adhesion established in these gels.

POS silicone gels are also known, from European Patent Application No. 69,451, for which the intended application is the encapsulation (potting) of electronic assemblies. The objective underlying the invention forming the subject-matter of this patent application is essentially to provide dielectric silicone gels which exhibit low-temperature physical-stability properties and which are obtained from rapid crosslinking at room temperature or at higher temperature. In order to achieve this objective, the inventors therefore propose a crosslinkable polyorgano-siloxane composition formed by an intimate mixture of the following products:

a polyorganosiloxane comprising from 80 to 96.5 mol % of siloxyl units $D=(CH_3)_2SiO$, from 2 to 10 mol% of siloxyl units $T=CH_3SiO_{3/2}$, from 1.25 to 6 mol% of terminal siloxyl units $M=(CH_3)_3SiO_{1/2}$ and from 0.25 to 4 mol% of terminal siloxyl units $M=(CH_3)_2(CH_2=CH)SiO_{1/2}$;

and a hydrogen-containing polyorgano-siloxane not having more than one hydrogen atom per silicon and substituted with alkyl radicals of the methyl type or by phenyl or 3,3,3-trifluoropropyl residues, the SiH/SiVi ratio being between 0.2 and 5; and a platinum-based catalyst.

It should be noted that this prior document stresses the essential character of the siloxyl units of type $T=Me\ SiO_{3/2}$ with regard to the low-temperature stability properties of the gel. Moreover, this document makes no mention of possible adhesive properties of the silicone gels prepared from these known compositions. In short, this proposal of the prior art has proved to be insufficiently satisfactory to meet the combined specifications of physical stability, damping ability and high rate of crosslinking. Furthermore, it makes no statement as regards self-adhesion.

The quest for self-adhesion for silicone gels was not the motivation of the invention described in European Patent Application No. 532,362, either. The silicone gel compositions described in the latter contain:

A—a polyorganosiloxane comprising from 90 to 97 mol% of units $D=R(CH_3)SiO_{2/2}$, from 0.1 to 2.5 mol% of units $T=RSiO_{3/2}$ and from 0.1 to 4 mol% of terminal units $M=(CH_3R)\ Si_{1/2}$ where R=methyl, phenyl or $CF_3CH_2CH_2$—groups and with the condition that the last two R groups represent from 0.5 to 10 mol% of the total of the R groups;

B—a polyhydrogenoorganosiloxane comprising at least one SiH per molecule and determining a SiH/SiVi ratio of between 0.5 and 1.5; and C—a platinum-based catalyst.

The hydrogen-containing B POS may be formed by a POS of the α,ω-(dimethylhydrogenosiloxy)poly (dimethylsiloxy) type and possibly by a POS of the α,ω-(dimethylhydrogenosiloxy) (methylhydrogenosiloxy) poly (dimethylsiloxy) type. In this application, examples are given only of mixtures, on the one hand, of α,ω-vinyl- and phenyl-substituted POSs and, on the other hand, of POSs which contain hydrogen in the chains and at the chain ends. The viscosity of the A POSs used is of the order of 1000 mPa.s, while that of the B POSs used for the preparation of the gels is of the order of 100 mPa.s. The presence of T (resin) units used here as agents for promoting the physical stability of the gels at low temperature is one of the essential characteristics of this prior technical proposal. Finally, it should be emphasized that there was no mention of any adhesive properties of the gels in question.

Silicone compositions are also known, from U.S. Pat. No 5,371,163, which have a low viscosity, can be crosslinked into a gel and comprise the following compounds:

an A POS of the SiVi (α,ω-vinyl pdms) type;

an extender B POS of the SiH type or an α,ω—(CH$_3$)$_2$HSiO POS;

a crosslinker C POS of the SiH (or even SiVi) type; and a hydrosilylation catalyst (Pt); with the condition that the number of hydrogen atoms linked to silicon represents more than 80% in number of the hydrogen atoms and of the vinyl radicals present in the extender B and the crosslinker C(SiH(B)/[SiH(B)+SiH(C)]) and the SiH (B)/SiVi(A) molar ratio is between 0.8 and 1.2.

This composition is characterized by a SiH(B)/[SiH(B)+SiH(C)] predominance, >80% in number, of the extender, with regard to a provision of hydrogeno-type hydrosilylation reactive functional groups (which are complementary to the vinyl groups in compound A). In addition, it should be noted that the ratio SiH of the extender/SiVi of the basic POS is relatively high. These structural characteristics are perhaps, at least in part, responsible for the average performance of this composition and of the gels emanating therefrom, pertaining to the damping, low-temperature and high-temperature physical stability and rate of crosslinking properties and to the dielectric characteristics. Furthermore, the compositions do not enable adhesive gels to be obtained.

Finally, mention may be made of Japanese Patent Application JP No. 06/016942 which describes a silicone composition which can be crosslinked into a gel and which comprises a POS of the SiVi type, a POS of the SiH type, and adhesion-promoting additive of the silane type (monocarboxylated alkoxysilane) and a platinum-based catalyst. The SiH/SiVi ratio of this composition is from 0.2 to 0.3. This application makes presumptions regarding adhesive properties which do not seem to be justified. Furthermore, the presence of the adhesion-promoting silane may have undesirable repercussions on the other properties of the gel obtained by crosslinking this composition.

In this state of knowledge, one of the essential objectives of the present invention is to provide silicone compositions which can be crosslinked into a gel by hydrosilylation, the said compositions properly leading to silicone gels endowed at the very least with the qualities expected in the products of the prior art, namely damping, rapid rate of crosslinking, low-temperature physical stability of the gel and industrial feasibility. These desirable qualities within the framework of the invention should furthermore be superior to those obtained hitherto. Finally and most especially, it is intended to obtain silicone gels having improved adhesion (self-adhesion) properties, these being particularly desirable especially in applications of the gels for protecting sensitive electronic units but also in medical and paramedical applications, to mention but these.

The Applicant has employed extensive means of research and many experiments to achieve this objective, among others. This finally resulted in the discovery, to the Applicant's credit, that, quite surprisingly and unexpectedly, it is advisable to introduce, under carefully and judiciously chosen quantitative conditions, a particular hydrogen-containing polyorganosiloxane into the precursor silicone compositions for the gels. This particular hydrogen-containing POS is in fact a functional additive which is completely compatible with the other POSs in the composition (contrary to the adhesion promoters which result in perturbations). This additive acts as an extender, with the presumed effect of increasing the size of the cells of the network during crosslinking.

An incidental further objective of the invention is to provide an adhesive-gel precursor silicone composition, which composition is simple to prepare, inexpensive, storage-stable and easy to use for the final user, who applies the composition just before it transforms in situ into a gel.

A further incidental object of the invention is to provide an adhesive-silicone-gel precursor system based on the composition of the type described hereinabove; the said system must be in a storage-stable form and be easy to handle and to use for making the gel.

A further incidental objective of the invention is to provide applications of the above composition and of the gel which it may form:

as means of encapsulating and protecting electronic units (potting, i.e. immersion, or else coating or sheathing);

as useful medical materials, for example for manufacturing implants, prostheses, assembly cement, etc., or else for manufacturing orthopaedic or paramedical articles;

as sealing mortar and/or mastic; and, finally, as an adhesive.

All these objectives, among others, are achieved by the present invention which relates, primarily, to a silicone composition which can be crosslinked into an adhesive gel by hydrosilylation, characterized in that it comprises:

(I)—at least one polyorganosiloxane POS (I) containing:
terminal siloxyl units of type $M=(R)_2(Fhr)SiO_{1/2}$ where:
R, which are identical or different from each other, correspond to a substituted or non-substituted aryl and/or $C_1$-$C_6$ linear or branched alkyl group;
Fhr corresponds to at least one kind of hydrogeno- or alkenyl- hydrosilylation reactive Functional group—vinyl forming part of the preferred alkenyls;
and identical or different siloxyl units of type $D=(R^1)_p(Fhr)_qSiO_{2/2}$ in which Fhr is as defined above, $R^1$ satisfying the same definition as R, and p=1 or 2, q=0 or 1 and p+q=2;

(II)—at least one polyorganosiloxane POS (II) comprising:
terminal siloxyl units $M=(Fhr)_s(R^2)_tSiO_{1/2}$ where
Fhr is as defined above;
$R^2$ satisfies the same definition as R;
s=0, 1, 2 or 3 and t=0, 1, 2 or 3 and s+t=3;
identical or different siloxyl units $D=(Fhr)_u(R^3)_vSiO_{2/2}$ where:
Fhr is as defined above;
$R^3$ satisfies the same definition as R;
u=0, 1 or 2, v=0, 1 or 2 and u+v=2; with the condition that at least one of the D units of the POS (II) carries a Fhr (u=1v=1);

(III)—at least one polyorganosiloxane POS (III) termed "extender POS" and having:

terminal siloxyl units M=(Fhr)$_w$(R$^4$)$_x$SiO$_{1/2}$ where
Fhr is as defined above;
R$^4$ satisfies the same definition as R;
w=1, 2 or 3, x=0, 1 or 2 and w+x=3;and the Fhrs of this POS (III) being chosen such that:
they react at least with the Fhrs of the terminal M units of the POS (I); and the ratio $$r_1 = \frac{\text{number of } Fhrs \text{ in the POS(III)}}{\text{number of } Fhrs \text{ in the POS(II)} + \text{POS(III)}} \times 100$$

is less than 80%, preferably less than or equal to 50% and more preferably still between 0.5 and 30%;
Siloxyl units D=(R$^5$)$_2$SiO$_{2/2}$ where
R$^5$ satisfies the same definition as R;
(IV)—optionally at least one polyorganosiloxane POS (IV) which is useful especially as a diluent for the POS (I) and contains terminal siloxyl units M=(R$^6$)$_3$SiO$_{1/2}$ and siloxyl units D=(R$^7$)$_2$Si$_{2/2}$ where R$^6$, R$^7$ are identical or different from each other and satisfy the same definition as R;
(V)—and an effective quantity of hydrosilylation catalyst, preferably of a platinum type.

The use of these specifically selected POSs enables silicone gels to be obtained which have improved properties, some of which will be mentioned hereinbelow.

First of all, the rate of crosslinking of these gels is high, satisfying the requirements of industrial feasibility and profitability, especially for the application to the potting of sensitive electronic components.

In addition, the viscoelastic properties of the gels made from the compositions according to the invention correspond well to the desired semi-solid/semi-liquid state. This state is suitable for providing the appropriate damping properties which allow complete absorption of shock and vibration.

The gels obtained furthermore have the advantage of being stable, whatever the external conditions, especially the temperature conditions. In particular, they withstand low temperatures well, their gelled texture not being affected by them.

It should be emphasized that these qualities of the compositions and gels according to the invention are acquired notwithstanding the necessary absence of POS comprising T units, which goes against the teaching of the prior art.

Finally and above all, one of the great advantages of the compositions of the invention is that they lead to adherent or self-adherent silicones. This is expressed by the fact that their adhesion, especially with respect to epoxy and aluminium substrates, is enhanced compared to known gels. Without wishing to be tied by theory, this exacerbation of the adhesion properties seems possibly to be related to the presence of the extender (III) in the composition in question.

This extender (III), which preferably comprises Fhrs only at its ends, has the purpose of reacting with the (complementary) Fhr$_s$s belonging to the POS (I). In fact, the extender (III) leads to an increase in the cells of the crosslinked network thus tying itself into the POS (I). This being so, the extender (III) is the reason for the increase in the elastic modulus and in the loss modulus of the gel, the resulting tan δ of which has, moreover, a value substantially equal to 1.

In fine, the adhesion of the gel to many substrates is significantly enhanced. This performance has reached such a point that, within the framework of a given peel test for evaluating the adhesion, there is no longer so-called adhesive failure occurring at the interface, as for the known gels, but so-called cohesive failure occurring right within the gel. This is a particularly revealing feature regarding the adhesive properties of the gels according to the invention.

It is important to note that this gain in adhesion does not occur to the detriment of the other properties of the compositions and gels of the invention. In particular, the thermal withstand of the gels does not suffer thereby, unlike what happens in certain adherent silicone gels comprising one or more adhesion promoters for obtaining this property.

In addition to the presence of the extender (III) and the meeting of specific ratios $r_1$, the invention also relies on the choice of the particular POS components and on certain quantitative options with regard to the said components, among others.

Thus, the POS (I) may be regarded as the "structuring" component or as the basis of the composition. Advantageously, it is the predominant component.

Preferably, the hydrosilylation reactive functional groups (Fhrs) which it contains are of a single type, either hydrogen or alkenyl, recognizing that among alkenyl groups, vinyl groups are those which are most commonly employed. They react very well with hydrogen in an addition mechanism.

More preferably still, the POS (I) has no Fhr within its chain, but only at its ends (q=0 in the D units).

In accordance with a preferred embodiment of the invention, the POS (I) have Fhr=Vi and q=0 in the D units.

According to a variant of this preferred embodiment, the terminal Fhr of the POS (I) correspond to hydrogen and also q=0 in the formula (I).

In practice, the POSs (I) more desirably employed are α,ω-(dimethylvinylsiloxy) polydimethyl-siloxanes for the preferred embodiment and α,ω-(dimethylhydrogenosiloxy) polydimethylsiloxanes for the variant.

Such POSs (I) are available commercially (e.g. RHODORSIL® 621 V from RHONE POULENC).

As regards POS (II), this may be likened to the composition crosslinker and preferably contains a single type of Fhr, these being advantageously distributed within the chains and possibly at the chain ends (in this case u=1 or 2 in the D units carrying Fhr and s≧1, preferably s=1, in the M units).

Within the scope of the preferred embodiment, the Fhrs of the POS (II) are hydrogen and are advantageously found both within the chains and at their ends.

In the variant, the pendant and terminal Fhrs are represented by vinyl groups (Vi).

Preferably, there are two different types of D units in the POSs (II), but it is not excluded for there to be as many of them as the u and v combinations in the formula given above for the D units of the POS (II) allow.

By way of examples of POS (II), mention may be made of:

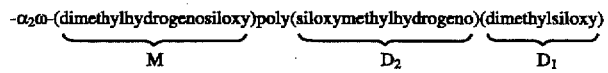

for the preferred mode; and

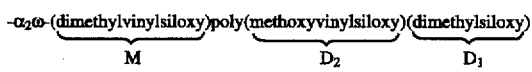

for the variant.

These POSs (II) are commercial products, such as, for example, RHODORSIL® 626 V 300 H1.7 from RHONE POULENC, and their structures and their methods of synthesis are widely disclosed in the technical literature.

It should be noted that, advantageously, the Fhrs of the invention are:

either Fhr=Vi and its complementary $Fhr_c$=H or Fhr=H and $Fhr_c$=Vi.

It is perfectly conceivable for the Fhrs and the $Fhr_c$s to be distributed non-uniformly and randomly in the POSs (I) and the POSs (II).

Advantageously however, the Fhr of each of the POSs (I), (II) and (III) are identical to each other and the Fhrs of the POS (I) are different from those of the POSs (II) and (III) [complementary Fhrs, $Fhr_c$s].

The extender (III) is a polyorganosiloxane (POS) which advantageously has Fhrs only on its terminal M siloxyl units. Preferably, it has much lower viscosity than the POS (I), for example of the order of that of POS (II).

The end Fhrs of the extender POS (III) are preferably chosen such that they preferentially react with the Fhrs of the POS (I). For this purpose, it is therefore desirable, although not limiting, that these Fhrs of the POS (III) be only of one type and complementary to those of the POS (I). Consequently, these Fhrs are generally and advantageously of the same type as those of the crosslinker POS (II).

In the preferred embodiment, the Fhrs of the POS (III) are represented by hydrogen, while they correspond to vinyl in the variant.

the number ratio $$r_1 = \frac{Fhr \text{ of the POS(III)}}{Fhr \text{ of the POS(II) and POS(III)}} \times 100,$$

which is <80% and preferably ≦50%, and where more preferably still 0.5%≦$r_1$≦30%, is one of the key parameters of the composition of the invention.

This ratio in fact determines the magnitude of the increase in the size of the cells in the crosslinked network by the POS (III). It is advantageous for this ratio $r_1$ to be less than 20% by weight and more preferably still to be about 5±2% by weight.

As a practical example of POS (III), mention may be made of:

α,ω-(dimethylhydrogenosiloxy)poly(dimethyl-siloxy) for the preferred embodiment; and α,ω-(dimethylvinylsiloxy)poly(dimethylsiloxy) for the variant of this preferred embodiment.

The structure and the method of preparation of POS (III) which can be used in the composition of the invention are furthermore widely illustrated in the literature of the prior art.

By way of example of a commercial product which can be used as POS (III), mention may be made of RHODORSIL® 620 H2 from RHONE POULENC.

According to an optional, but nevertheless advantageous, arrangement of the invention, the POS (I) is diluted using a POS (IV) containing M and D units, in which the $R^6$ and $R^7$ substituents are preferably of the same type as the substituents R and $R^1$ in the POS (I). More preferably still, $R^6$=$R^7$=$RR^1$=$CH_3$.

This POS (IV) consists, for example, of an α,ω-(trimethylsiloxy) polydimethylsiloxane oil.

This type of POS is readily available commercially, for example a product sold by RHONE POULENC under the name RHODORSIL® 47 V 100. The choice of the diluent POS (IV) is made naturally depending on the type of POS (I) and it is clear that, by definition, the POS (IV) will have a lower viscosity than that of the POS (I). Thus, in accordance with a preferred characteristic of the invention, the composition includes at least one POS (IV) having an essentially linear structure and a dynamic viscosity lower than that of the POS (I), preferably at least 20 times lower and more preferably still 5 times lower than that of the POS (I).

It goes without saying that the proportions of Fhr and $Fhr_c$ present in each of the POSs (I) to (III) of the composition are not anodine. A non-limiting illustration of this is given below:

POS (I): Fhr=Vi and/or H, present in a proportion of from 0.01 to 10% by weight, preferably from 0.05 to 1% by weight and more preferably still in a proportion of approximately 0.1% by weight;

POS (II): Fhr=H and/or Vi, present in a proportion of from 0.01 to 10, preferably from 0.1 to 1.5 and more preferably still in a proportion of approximately 0.7% by weight;

POS (III): Fhr=H and/or Vi, present in a proportion of from 0.01 to 10, preferably from 0.5 to 1 and more preferably still in a proportion of approximately 0.2% by weight.

The catalyst (V) is another important element in the composition according to the invention. Preferably, this is an organometallic complex of platinum or of one of the platinum-based catalysts conventionally employed for catalyzing hydrosilylation reactions between SiH residues and SiVi residues. By way of examples, mention may be made of black platinum, chloroplatinic acid, a chloroplatinic acid modified by an alcohol, a complex of the chloroplatinic acid with an olefin, an aldehyde, a vinylsiloxane or an acetylenic alcohol, among others. U.S. Pat. No. 2,823,218 discloses a hydrosilylation catalyst of the chloro-platinic-acid type and U.S. Pat. No. 3,419,593 relates to catalysts formed by complexes of chloroplatinic acid and an organosilicone of the vinylsiloxane type. Complexes of Platinum and hydrocarbons useful as hydrosilylation catalysts are disclosed by U.S. Pat. Nos. 3,159,601 and 3,159,662. U.S. Pat. No. 3,723,497 describes a platinum acetylacetonate and the subject of U.S. Pat. No. 3,220,972 is catalysts based on a platinum alcoholate.

With regard to the quantities which are catalytically effective to use, it goes without saying that one skilled in the art in the field in question is perfectly able to determine the optimum quantity of catalyst for promoting the crosslinking. This entity depends especially on the type of catalyst and on the POSs in question. In order to be more specific, it may be indicated that this will be between 0.1 and 40 ppm (e.g. 15 ppm) per 100 parts by weight of POS (I).

To continue with other advantageous characteristics of the POSs (I) to (IV), it may be indicated that they advantageously have a substantially linear structure.

The viscosity of the POSs of the composition according to the invention also constitutes a parameter to be taken into consideration, especially with regard to the ease of handling this composition and the viscoelastic properties of the gel which can be obtained by crosslinking this composition.

With regard to and in accordance with an advantageous arrangement of the invention, the POS (I) is substantially linear and has a dynamic viscosity of less than or equal to 500,000 mPa.s, preferably of between 1000 and 200,000 mPa.s;

and/or the POS (II) is substantially linear and has a dynamic viscosity of less than or equal to 100,000 mPa.s, preferably less than 1000 mPa.s and more preferably still of between 10 and 100 mPa.s;

and/or the POS (III) is substantially linear and has a dynamic viscosity of less than or equal to 100,000 mPa.s, preferably less than 1000 mPa.s and more preferably still of between 10 and 100 mPa.s.

Another parameter not without influence on the rheological and adhesion properties of the adherent silicone gel according to the invention is the number ratio:

$$r_2 = \frac{Fhr \text{ of the POS(II) and of the POS(III)}}{Fhr_c \text{ of the POS(I)}}$$

[$Fhr_c$=Fhr complementary to, i.e. reactive with, Fhr].

The Fhrs of the crosslinker (II) and of the extender (III) on the one hand, and the complementary Fhrs of the structuring POS (I) on the other hand, are those which are capable of reacting together to form a crosslinked network and the gel in accordance with the invention.

Advantageously, this molar ratio $r_2$ is less than or equal to 0.8, preferably between 0.1 and 0.7 and more preferentially still between 0.3 and 0.6.

Within the scope of the preferred embodiment of the invention the number ratio $$r_2 = \frac{Fhr = \text{hydrogen(II + III)}}{Fhr_c = \text{vinyl(I)}}$$

is less than or equal to 0.8 and more preferably still is between 0.4 and 0.55.

In practice, a composition according to the preferred embodiment of the invention may be that characterized in that:

the POS (I) comprises M units in an amount of from 0.2 to 1 mol %, in which R=$CH_3$, Fhr=vinyl, as well as D units in an amount of from 99 to 99,8 mol %, in which $R^1$=$CH_3$, p=2 and q=0;

the POS (II) comprises M units in an amount of from 1 to 6 mol %, in which Fhr=H, $R^2$=$CH_3$, s=1 and t=2, and D units in an amount of from 10 to 50 mol%, in which $R^3$=$CH_3$, Fhr=H, u=1 and v=1;

the POS (III) comprises M units in an amount of from 8 to 20 mol %, in which Fhr =H, $R^4$=$CH_3$, w=1 and x=2, and D units in an amount of from 80 to 92 mol %, in which $R^5$=$CH_3$;

and in that a diluent POS (IV) is provided in which the M and D units contain, respectively, $R^6$=$R^7$=$CH_3$ and are present in an amount of approximately at most 10 mol % of M units and at least 90 mol % of D units, the diluent (IV) preferably being present in a quantity less than or equal to 50% by weight, preferably less than 40% by weight and more preferably still between 5 and 20% by weight with respect to the POS (I)+(IV) mixture.

In order to improve the storage stability of the composition according to the invention and to supply users with a commercially available form which is easy to handle, a system is provided which has at least two components A and B containing the POSs (I) to (III) and optionally (IV) as well as the catalyst (V) of the composition as defined hereinabove, each of these two components A and B not containing a mixture of POS (I)+(II) and/or (III) with the catalyst (V). Preferably, the said catalyst (V) is exclusively contained in one of the components, A or B, of the system.

Thus the component A may, for example, contain at least part of the POS (I) and at least part of the POS (IV) as well as the catalyst (V), while the component B comprises the POS (II) and the POS (III) and optionally the remaining part of the POSs (I) and (IV).

In order to simplify use, it is preferable to provide a two-component system in which the proportions A:B are between 40:60 and 60:40 and are preferably approximately 50:50 parts by weight.

With regard to making the gel, it may be pointed out that the crosslinking of the composition into a gel takes place at room temperature or after heating to temperatures of between 100° and 180° C., for example. In this context, the crosslinking times necessary are, for example, between a few minutes and 1 hour 30 minutes.

The crosslinked adhesive gel obtained from the composition described above forms a separate subject of the present invention.

With regard to applications, the composition and the gel according to the invention may be used as shock-absorber means and as means for protecting (potting) electronic components or the like. The composition and/or the gel may thus be poured into a container comprising sensitive electronic elements mounted on any substrate, for example one made of epoxy resin. The fragile elements are, in fact, immersed in the silicone composition in this case.

The composition and the gel may also encapsulate sensitive electronic components with a view to protecting them by other means e.g.: covering sheath, etc.

On account of these particularly significant adhesive properties, the silicone gel according to the invention may also be used for making:

adhesives;

or medical materials, preferably of the type of those involved in the construction of implants, prostheses, cements or the like;

or sealing products, mastics or sealing compositions; or assembly products.

The present invention also relates, by way of novel products, to adhesives, medical materials, and shock-absorber and protection means, cements, mastics or sealants produced from this silicone gel.

In these applications, it is optional to use all or part of the advantageous properties of the gel and of the composition according to the invention—rapid rate of crosslinking, low-temperature and high-temperature physical stability (viscoelasticity), damping properties, ability to isolate, especially, with respect to air and, in particular, to water, and finally, and above all, adhesive properties.

The following non-limiting examples show various possible ways of formulating the compositions according to the invention, as well as the characteristics and properties of the silicone gels obtained by crosslinking the said compositions.

EXAMPLES

Example 1

The compositions described are in two-component form and crosslinking takes place after mixing two parts, called A and B, in a 50/50 ratio.

Description

1) The list below describes the raw materials used in the compositions of parts A and B for this gel.

2) Table 1 describes the concentrations of each of these constituents in parts A and B.

3) Methodology for obtaining the gels.

4) Table 2 gives the physical properties obtained in these compositions and, particularly, the influence of the oil (III) (=α,ω-(dimethylhydrogeno-siloxy)poly(dimethylsiloxy) oil, having a viscosity of 20 mPa.s and containing 0.2% of H groups), on the adhesion properties of the compositions on epoxy and aluminium.

1) List of Raw Materials Used

POS (I)=α,ω-(dimethylvinylsiloxy)polydimethylsiloxane oil having a viscosity of 60,000 mPa.s and containing approximately 0.1% by weight of ($CH_2$= CH) groups;

POS (II)=α,ω-(dimethylhydrogenosiloxy) poly (methylhydrogenosiloxy)(dimethylsiloxy) oil having a viscosity of 25 mPa.s and containing 0.7% by weight of H groups;

POS (III)=α,ω-(dimethylhydrogenosiloxy)poly-(dimethylsiloxy) oil having a viscosity of 20 mPa.s and containing 0.2% by weight of H groups;

POS (IV)=α,ω-(trimethylsiloxy)polydimethylsiloxane oil having a viscosity of 100 mPa.s;

Catalyst (V)=platinum organometallic complex used as a crosslinking catalyst; the concentrations of this catalyst are given in ppm of Pt metal of oxidation number=0.

2) Table1: Formulation of the Compositions Tested

TABLE 1

| Composition | Concentration, % | | | |
|---|---|---|---|---|
| Reference | Part A | Part B | | |
| Constituents | A1 | B1 | B2 | B3 |
| POS (I) | 50 | 49.1 | 49.1 | 49.1 |
| POS (IV) | 50 | 50 | 50 | 50 |
| POS (II) | — | 0.9 | 0.855 | 0.81 |
| POS (III) | — | 0 | 0.045 | 0.09 |
| Catalyst (V) | 15 ppm Pt | — | — | — |

$$r_1 = \frac{\text{SiH of the POS(III)}}{\text{SiH of the POS(II)} + \text{POS(III)}} \times 100$$

is equal to 5.8% for Test 2 and to 11.4% for Test 3.

The ratio $r_2=[H](II+III)/[Vi](I)$ is equal to 0.51, 0.52 and 0.53, respectively, for Tests 1 to 3.

3) Methodology

The gels are made simply by mixing the constituents of the compositions in a stirred reactor at 25° C.

4) Table 2: Physical and Adhesion Properties of the Gels Obtained

TABLE 2

| TESTS Crosslinking | 1 A1 + B1 | 2 A1 + B2 | 3 A1 + B3 |
|---|---|---|---|
| Properties: | | | |
| viscous modulus G", Pa | 2707 | 2207 | 2107 |
| elastic modulus G', Pa | 3857 | 2607 | 2438 |
| tan delta | 0.71 | 0.85 | 0.86 |
| ADHESION to EPOXY | | | |

TABLE 2-continued

| TESTS Crosslinking | 1 A1 + B1 | 2 A1 + B2 | 3 A1 + B3 |
|---|---|---|---|
| peel force, N/mm | 0.06 | 0.16 | 0.17 |
| failure type | adhesive | cohesive | cohesive |
| ADHESION to ALUMINIUM | | | |
| peel force, N/mm | 0.067 | 0.176 | — |
| failure type | adhesive | cohesive | — |

By adhesive failure is meant breaking (or tearing) which propagates between the gel layer and the substrate.

By cohesive failure is meant breaking (or tearing) which propagates within the gel layer, the surface of the substrate being, at least partly, covered with residues of gel.

Test 1 is on the mixture of part A1 and of part B1 which does not contain oil (III)—this is the control test.

Tests 2 and 3 are on the mixtures of parts A1 and parts B2 and B3 which contain, respectively, increasing amounts of oil (III).

The viscoelastic properties G' and G" were measured on a CARRI-MED CS 100 forced-stress rheometer under the following conditions:

temperature=23° C.;

cone dimensions: diameter=2 cm and angle=4 degrees;

frequency scan from 0.5 to 10 hertz;

torque=500 µN.m.

The adhesion was measured on a ADAMEL LHOMARGY DY 30 tensometer using the 90-degree peel method on test pieces of dimensions 200 mm×50 mm×25 mm, cleaned beforehand using trichloroethane.

These results show that introducing an α,ω-(dimethylhydrogenosiloxy)poly (dimethylsiloxy) oil improves the adhesion of the compositions to epoxy and aluminium.

Example 2

Description

1) The list below describes the raw materials used in the compositions of parts A and B for this gel.

2) Table 3 describes the concentrations of each of these constituents in parts A and B.

3) Methodology

4) Table 4 shows the adhesion properties of these compositions and particularly the influence of the oil (III) (=α,ω-(dimethylhydrogenosiloxy)poly-(dimethylsiloxy) oil having a viscosity of 20 mPa.s and containing 0.2% of H groups), to an epoxy substrate.

1) List of the Raw Materials Used

POS (I)=α,ω-(dimethylvinylsiloxy)polydimethylsiloxane oil having a viscosity of 60,000 mPa.s and containing approximately 0.1% by weight of ($CH_2$= CH) groups;

POS (II)=α,ω-(dimethylhydrogenosiloxy)poly(methylhydrogeno-siloxy)(dimethylsiloxy) oil having a viscosity of 25 mPa.s and containing 0.7% of H groups;

POS (III)=α,ω-(dimethylhydrogenosiloxy)poly-(dimethylsiloxy) oil having a viscosity of 20 mPa.s and containing 0.2% of H groups;

Catalyst (V)=platinum organometallic complex used as crosslinking catalyst; the concentrations of this catalyst are given in ppm of Pt metal.

2) Table 3: Formulation of the Compositions Tested

TABLE 3

| Composition | Concentration, % | | |
|---|---|---|---|
| Reference | Part A | Part B | |
| Constituents | A2 | B4 | B5 |
| (I) | 100 | 98.2 | 98.2 |
| (II) | — | 1.8 | 1.71 |
| (III) | — | 0 | 0.09 |
| (V) | 15 ppm Pt | — | — |

$$r_1 = \frac{SiH \text{ of } (III)}{SiH \text{ of } (II) + (III)} \times 100 = 5.8\%$$

The ratio $r_2$, [H](II+III)/[Vi](I), is equal to 0.5 for each of the compositions.

Test 4 is on the mixture of part A2 and of part B4 which does not contain oil (III)—this is the control test.

Test 5 is on the mixture of part A2 and of part B4 which contains the oil (III).

3) Methodology

The gels are made simply by mixing the constituents of the compositions in a stirred reactor at 25° C. The adhesion properties (peel force) were measured under the conditions described in Example 1.

4) Table 4: Adhesion Properties of the Compositions Tested

TABLE 4

| TESTS Crosslinking | 4 A2 + B4 | 5 A2 + B5 |
|---|---|---|
| ADHESION to EPOXY | | |
| peel force, N/mm | 0.06 | 0.35 |
| failure type | adhesive | cohesive |

These results also show that introducing an α,ω-(dimethyl-hydrogenosiloxy)poly(dimethylsiloxy) oil (III) improves the adhesion of the compositions to epoxy.

Example 3

Influence of the Concentration of Extender POS (III) in the Composition

Description

1) The list below describes the raw materials used.

2) Formulations tested.

3) Preparation and test methodology

4) Results: Influence of the concentration of extender POS (III) on the physical (rheological) and adhesion properties of the silicone gels tested.

1) List of the Raw Materials Used

POS (I): α,ω-(dimethylvinylsiloxy)polydimethylsiloxane oil having a viscosity of 60,000 mPa.s and containing approximately 0.1% by weight of Vi (RHODORSIL® 621 V 60 000);

POS (II): α,ω-(dimethylhydrogenosiloxy)-poly(methylhydrogenosiloxy)(dimethylsiloxy) crosslinking oil having a viscosity of 300 mPa.s and containing approximately 0.17% by weight of H groups (RHODORSIL® 626 V 300 H 1.7);

POS (III): α,ω-(dimethylhydrogenosiloxy)poly(dimethylsiloxy) extender oil having a viscosity of 20 mPa.s and containing 0.2% by weight of H groups (RHODORSIL® 620 H2);

POS (IV): diluent=α,ω-(trimethyl-siloxy)polydimethylsiloxane oil having a viscosity of 100 mPa.s (RHODORSIL® 47 V 100);

Catalyst (V)=platinum organometallic complex used as a crosslinking catalyst; the concentrations of this catalyst are given in ppm of Pt metal.

2) Formulations: Table 5 (in 50/50 A and B two-component form).

TABLE 5

| 50% DILUTION | A | B6 | B7 | B8 | B9 |
|---|---|---|---|---|---|
| POS (I) | 50 | 49.1 | 49.1 | 49.1 | 49.1 |
| POS (IV) | 50 | 50 | 50 | 50 | 50 |
| POS (II) | — | 0.9 | 0.855 | 0.80 | 0.72 |
| POS (III) | — | — | 0.045 | 0.09 | 0.018 |
| Catalyst (V)) | 15 ppm Pt | — | — | — | — |
| $r_1 = \frac{SiH(III)}{SiH(III) + SiH(II)} \cdot 100(\%)$ | — | 0 | 5.8 | 10.1 | 22.8 |
| 30% DILUTION | A | B10 | B11 | B12 | B13 |
| POS (I) | 70 | 67.8 | 67.8 | 67.8 | 67.8 |
| POS (IV) | 30 | 30 | 30 | 30 | 30 |
| POS (II) | — | 1.2 | 1.14 | 1.08 | 1.00 |
| POS (III) | — | — | 0.06 | 0.12 | 0.20 |
| Catalyst (V) | 15 ppm Pt | — | — | — | — |

TABLE 5-continued

| | | | | |
|---|---|---|---|---|
| $r_1 = \frac{SiH(III)}{SiH(III) + SiH(II)} \cdot 100(\%)$ | — | 0 | 5.8 | 10.1 | 22.8 |

3) Preparation and Test Methodology: Idem Examples 1 and 2

4) Results: Table 6

The results are given in Table 6 below; the tests were carried out for two dilutions—30 and 50%—of POS oil (IV).

The oil, POS (III), has the effect of extending the cells of the network. This leads to the following variations:

Rheological Properties

The elastic modulus G' decreases substantially on adding 5% of oil 620 H2; above this level, the variation is less substantial. The viscous modulus G" remains constant. Consequently, the values of tan δ increase, with a major first variation, on adding oil (III).

Adhesion Properties

The effect of the oil (III) on the adhesion properties is appreciable; in addition to the peel forces increasing, the failure mode changes from an adhesive type to a cohesive type on adding oil (III).

TABLE 6

INFLUENCE of the "extending" oil POS (III)

POS (IV) DILUTION = 30% by weight with respect to POS (I) + (II)

| $r_1$ | 0 | 5.8 | 10.1 | 22.8 |
|---|---|---|---|---|
| *Rheological properties* | | | | |
| G', Pa | 8860 | 6572 | 6335 | 5900 |
| G', Pa | 4928 | 4713 | 4720 | 4677 |
| tan δ | 0.57 | 0.72 | 0.75 | 0.8 |
| *Adhesion properties* | | | | |
| *Peel on epoxy* | | | | |
| N/mm | 0.07 | 0.2 | 0.23 | 0.23 |
| Failure | adhesive | cohesive | cohesive | cohesive |

POS (IV) DILUTION = 50% by weight with respect to POS (I) + (II)

| $r_1$ | 0 | 5.8 | 10.1 | 22.8 |
|---|---|---|---|---|
| *Rheological properties* | | | | |
| G', Pa | 3857 | 2607 | 2438 | 2594 |
| G", Pa | 2707 | 2207 | 2107 | 2303 |
| tan δ | 0.71 | 0.85 | 0.86 | 0.89 |
| *Adhesion properties* | | | | |
| *Peel on epoxy* | | | | |
| N/mm | 0.06 | 0.16 | 0.17 | 0.15 |
| Failure | adhesive | cohesive | cohesive | cohesive |

What is claimed is:

1. A silicone composition which can be crosslinked into an adhesive gel by hydrosilylation comprising:

(I)—at least one polyorganosiloxane POS (I) containing:
   1) terminal siloxyl units M of the formula: $(R)_2(Fhr)SiO_{1/2}$ wherein:
      the R groups, which are identical or different from each other, are selected from the group consisting of a substituted aryl, a non-substituted aryl, a $C_1$–$C_6$ linear alkyl, and a $C_1$–$C_6$ branched alkyl;
      Fhr is an hydrogeno- or alkenyl- hydrosilylation reactive functional group; and
   2) identical or different siloxyl units D of the formula: $(R^1)_p(Fhr)_qSiO_{2/2}$ in which Fhr is as defined above, $R^1$ has the same definition as R, and p=1 or 2, q=0 or 1 and p+q=2;

(II)—at least one polyorganosiloxane POS (II) comprising:
   1) terminal siloxyl units M of the formula: $(Fhr)_s(R^2)_tSiO_{1/2}$ wherein
      Fhr is as defined above;
      $R^2$ has the same definition as R; and
      s=0, 1, 2 or 3 and t=0, 1, 2 or 3 and s+t=3; and
   2) identical or different siloxyl units D of the formula: $(Fhr)_u(R^3)_vSiO_{2/2}$ where:
      Fhr is as defined above;
      R has the same definition as R; and
      u=0, 1 or 2, v=0, 1 or 2 and u+v=2; with the condition that at least one of the D units of the POS (II) carries a Fhr (u=1, v=1);

(III)—at least one polyorganosiloxane POS (III) having:
   1) terminal siloxyl units M of the formula: $(Fhr)_w(R^4)_xSiO_{1/2}$ where
      Fhr is as defined above;
      $R^4$ has the same definition as R;
      w=1, 2 or 3, x=0, 1 or 2; and w+x=3; and the Fhrs of this POS (III) being selected such that: they react at least with the Fhrs of the terminal M units of the POS (I); and the ratio $$r_1 = \frac{\text{number of Fhrs in the POS (III)}}{\text{number of Fhrs in the POS (II)} + \text{POS (III)}} \times 100$$

is less than 80: and
   2) siloxyl units D of the formula; $(R^5)_2SiO_{2/2}$ wherein $R^5$ has the same definition as R;

(IV)—optionally at least one polyorganosiloxane POS (IV) being a diluent for the POS (I) and containing terminal siloxyl units $M=(R^6)_3SiO_{1/2}$ and siloxyl units D of the formula: $(R^7)_2SiO_{2/2}$ wherein $R^6$, $R^7$ are identical or different from each other and have the same definition as R, and (V)—an effective quantity of hydrosilylation catalyst.

2. A composition according to claim 1 wherein the ratio $r_1$ is less than or equal to 50%.

3. A composition according to claim 2 wherein the ratio $r_1$ is between 0.5 and 30%.

4. A composition according to claim 1 wherein the hydrosilylation catalyst is a platinum catalyst.

5. A composition according to claim 1 wherein the ratio:

$$r_2 = \frac{\text{number of Fhrs of the POS(II) and of the POS(III)}}{\text{number of Fhr of the POS(I)}}$$

is less than or equal to 0.8.

6. A composition according to claim 5 wherein the ratio $r_2$ is between 0.1 and 0.7.

7. A composition according to claim 6 wherein the ratio $r_2$ is between 0.3 and 0.6.

8. A composition according to claim 1 wherein the Fhrs of each of the POS (I), (II) and (III) are identical to each other.

9. A composition according to claims 1 wherein:

the POS (I) comprises Fhrs corresponding to vinyl groups and D units in which q=0, the POS (II) comprises Fhrs corresponding to hydrogen, and the POS (III) comprises Fhrs corresponding to hydrogen.

10. A composition according to claim 1 wherein the POS (I) is substantially linear and has a dynamic viscosity of less than or equal to 500,000 mPa.s, the POS (II) is substantially linear and has a dynamic viscosity of less than or equal to 100,000 mPa.s, and the POS (III) is substantially linear and has a dynamic viscosity of less than or equal to 100,000 mPa.s.

11. A composition according to claim 10 wherein the POS (I) has a dynamic viscosity of between 1000 and 200,000 mPa.s., the POS (II) has a dynamic viscosity of less than 1000 mPa.s, and the POS (III) has a dynamic viscosity of less than or equal to 1000 mPa.s.

12. A composition according to claim 10 wherein the POS (II) has a dynamic viscosity of between 10 and 100 mPa.s and the POS (III) has a dynamic viscosity of between 10 and 100 mPa.s.

13. A composition according to claims 10 containing at least one POS (IV) having an essentially linear structure and a dynamic viscosity less than that of the POSs (I).

14. A composition according to claim 13 wherein the POS (II) has a dynamic viscosity of 5 times less than that of the POS (I).

15. A composition according to claim 1 wherein:

the POS (I) comprises M units in an amount of from 0.2 to 1 mol %, in which R=CH$_3$, Fhr=vinyl, as well as D units in an amount of from 99 to 99,8 mol %, in which $R^1$=CH$_3$, p=2 and q=0 the POS (II) comprises M units in an amount of from 1 to 6 mol %, in which Fhr=H, $R^2$=CH$_3$, s=1 and t=2, and D units in an amount of from 10 to 50 mol %, in which $R^3$=CH$_3$, Fhr=H, u=1 and v=1 the POS (III) comprises M units in an amount of from 8 to 20 mol %, in which Fhr=H, $R^4$=CH$_3$, w=1 and x=2, and D units in an amount of from 80 to 92% by weight, in which $R^5$=CH$_3$, and wherein a diluent POS (IV) is provided in which the M and D units contain, respectively, $R^6$=$R^7$=CH$_3$ and are present in an amount of approximately at the most 10 mol % of M units and at least 90 mol % of D units.

16. A composition according to claim 1 wherein the diluent (IV) is being present in a quantity less than or equal to 50% by weight with respect to the weight of the POS (I)+(IV) mixture.

17. A composition according to claim 16 wherein the diluent (IV) is being present in a quantity less than 40% by weight.

18. A composition according to claim 17 wherein the diluent (IV) is being present in a quantity between 5 and 20% by weight.

19. A System having at least two components containing the POS (I) and (III) and optionally (IV) and the catalyst (V) of the composition according to claim 1 wherein the catalyst is exclusively contained in one of the two components.

20. A crosslinked adhesive gel obtained from the composition according to claim 1.

21. A crosslinked adhesive gel obtained from the system according to claim 19.

22. A composition according to claim 1, wherein the Fhr functional group is vinyl.

23. A composition according to claim 1 wherein the Fhrs of the POS (I) are different from those of the POS (II) and (III).

24. A process of encapsulating an element comprising the step of:

immersing said element in a composition according to claim 1; and crosslinking said composition into a gel.

25. A process of encapsulating an element comprising the step of immersing said element in a gel according to claim 21.

* * * * *